Sept. 22, 1959     H. B. SMITH     2,905,817

SWEEP GENERATOR

Filed Sept. 9, 1955

WITNESSES

INVENTOR
Harry B. Smith
BY
ATTORNEY

2,905,817

SWEEP GENERATOR

Harry B. Smith, Catonsville, Md., assignor to Westinghouse Electric Corporation, East Pittsburgh, Pa., a corporation of Pennsylvania Application September 9, 1955, Serial No. 533,403

3 Claims. (Cl. 250—27)

This invention relates to sweep generators and more particularly to circuits for producing sawtooth voltage waves which can be held, when desired, at any intermediate value of the sawtooth.

Many types of sweep generators for producing sawtooth waves have previously been proposed. Most of these generators recycle automatically until the generator is cut off. However, in some installations, especially in radar automatic range tracking and lock-on systems, it is necessary to provide a sweep generator which can be stopped at any voltage level in its cycle and held at that voltage level for a period of time.

It is an object of my invention to provide a new and improved sweep generator.

Another object of my invention lies in the provision of a sweep generator which can be stopped at any voltage level in its cycle and held at that voltage level for a period of time.

A still further object of my invention is to provide a sweep generator which is simple and inexpensive in construction.

The above and other objects and features of my invention will become apparent from the following detailed description taken in connection with the accompanying drawings which form a part of this specification and in which.

Figure 1:
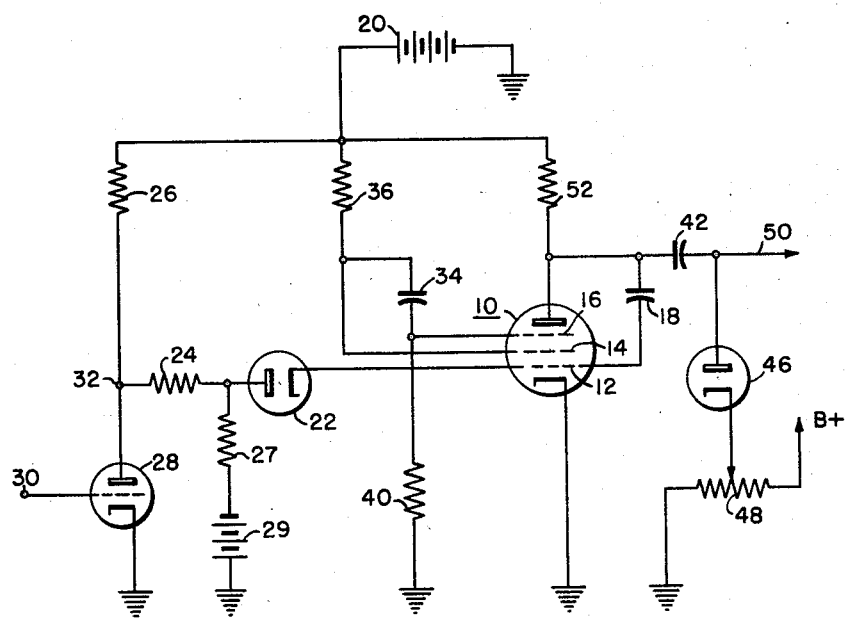
Figure 1 is a schematic circuit diagram of one embodiment of my invention.

Referring to Fig. 1, the circuit shown comprises a pentode vacuum tube 10 having a control grid 12, screen grid 14 and suppressor grid 16 included therein. Connected between the anode of pentode 10 and control grid 12 is a capacitor 18 which renders the circuit a feedback or operational integrator. Control grid 12 is also connected to the high potential side of anode voltage source 20 through a diode 22 and a pair of serially-connected resistors 24 and 26. A resistor 27 is connected between the high potential side of diode 22 and a negative voltage source 29, thereby forming a voltage divider. A triode 28 has its cathode grounded and its anode connected through resistor 26 to the high potential side of anode voltage source 20. By varying the voltage applied to terminal 30, the voltage at point 32 and, hence, the bias on the anode of diode 22 can be controlled to render it either conducting or cutoff. The ratio of resistor 27 to resistor 24 is such as to permit diode 22 to conduct when tube 28 is non-conducting but to cause diode 22 to disconnect when triode 28 is conducting.

Screen grid 14 is connected to the high potential side of voltage source 20 through resistor 36. A capacitor 34 also connects screen grid 14 to suppressor grid 16. As shown, the junction of suppressor grid 16 and capacitor 34 is grounded through resistor 40.

The output circuit for the generator comprises capacitor 42 connected in series with the plate of a diode 46. The cathode of diode 46 is connected to ground through a variable resistor 48 having one terminal connected to the positive terminal of a source of direct current voltage, not shown. Output voltages from the generator will appear between terminal 50 and ground. With this arrangement, it is possible to adjust the slider on variable resistor 48 so that a predetermined fixed voltage will appear at output terminal 50. The output of pentode 10 will then vary the output voltage below this fixed value. Since there is no direct path to ground for grid 12 of pentode 10 when diode 22 is not conducting, voltages placed on capacitor 18, will be more or less fixed and the capacitor will discharge at a leisurely rate due to finite leakage resistance across capacitor 18 and from grid 12 to ground.

Operation of the invention is as follows: Initially, it will be assumed that triode 28 is cut off. Under these conditions diode 22 is biased in the forward direction to pass current, in the conventional sense, from anode to cathode. Pentode 10 now conducts and the negative going waveform shown in Fig. 2 appears at the plate of the pentode by virtue of the flow of current through capacitor 18, diode 22, and resistors 24 and 26. The slope of the negative going waveform is determined in obvious manner by the time constant of capacitor 18, the magnitude of voltage source 20, resistors 24 and 26, and to a lesser extent, resistor 27.

Figure 2:
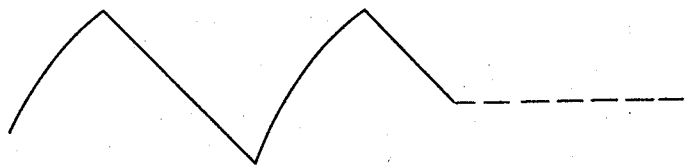
Fig. 2 is a graphical illustration of the operation of the circuit shown in Fig. 1.

Control of conduction through pentode 10 is determined by the voltage appearing on suppressor grid 16. This, in turn, is determined by the voltage appearing across resistor 36, coupled to the suppressor grid through capacitor 34. With such an arrangement, the circuit is made free running by virtue of a transition effect. Whenever pentode 10 conducts, its plate voltage decreases linearly as shown in Fig. 2 until a low value is reached at which the screen grid current begins to exhibit a rapid increase. At this point a negative voltage is developed on suppressor grid 16 sufficient to cut off the plate current of the pentode 10. The plate current remains cut off until capacitor 34 discharges through resistor 40 to ground. Thus, the cutoff period is determined by the time constant of resistor 40 and capacitor 34. During the cutoff period, capacitor 18 is discharged by current flowing from grid 12 to the cathode of pentode 10 and by current flowing through plate resistor 52 to produce the non-linear rise in output voltage shown in Fig. 2. After capacitor 34 discharges through resistor 40 to the point where the voltage on suppressor grid 16 rises above the cut-off value plate current flow resumes in pentode 10 and the cycle is repeated.

Whenever a positive voltage is applied to terminal 30 during the conductive period of pentode 10, triode 28 will conduct to bias diode 22 in the reverse direction. The charging path of capacitor 18 is thereby broken; and, consequently, the grid and plate voltage of pentode 10 remain at their last previous value. The pentode 10 thereafter remains conducting by an amount determined by its grid to ground potential and is prevented from recycling. Furthermore, by virtue of the feedback through capacitor 18, the circuit is rendered a feedback storage circuit since any tendency for the potential of grid 12 to change is resisted by the amplification of pentode 10. In this manner the last value of plate voltage is held virtually constant for a long period of time. This condition is indicated by the dotted line in Fig. 2.

Although I have described my invention in connection with a certain specific embodiment, it should be readily apparent to those skilled in the art that various changes in form and arrangement of parts can be made to suit requirements without departing from the spirit and scope of the invention.

I claim as my invention:

1. In a sweep generator, the combination of an electron valve having at least two control electrodes included therein, an anode and cathode for said electron valve, a source of anode voltage for said tube having its low potential side connected to a point of reference potential, a first capacitor connecting the anode of said vacuum tube with one of said grids, a unidirectional current device having its cathode connected to said one grid, means connecting the anode of said unidirectional current device to the high potential side of said anode voltage source, said unidirectional current device being normally biased in the forward direction to permit current flow therethrough, means including a second capacitor for connecting the other of said grids to said high potential side, variable voltage control means connected to said unidirectional current device for applying a control voltage to the latter said device for selectively biasing said unidirectional current device in the reverse direction to control the current flow through said current device, and means for selectively biasing said unidirectional current device in the reverse direction to control the current flow through said current device therethrough, and means connecting said anode and cathode to said high potential side and said point of reference potential respectively.

2. In a sweep generator, a source of direct current voltage, an electron valve, an anode and cathode for said electron valve which are connected respectively to the positive and negative terminals of said voltage source, at least two voltage responsive elements for controlling current flow through said electron valve, a first capacitor connecting the anode of said electron valve with one of said control elements, means including a unidirectional current device for connecting said one control element with the positive terminal of said direct current voltage source, means including a second capacitor connecting the positive terminal of said voltage source to the other of said control elements, a resistor directly connecting said other control element to the negative terminal of said voltage source, and variable voltage control means connected to said unidirectional current device for applying a control voltage to the latter said device for selectively controlling current flow through said unidirectional current device.

3. In a sweep generator, a source of direct current voltage, an electron valve, an anode and cathode for said electron valve, at least two voltage responsive elements for controlling current flow through said electron valve, a capacitive element connecting one of said control elements with said anode, an electron path connecting said one control element with the positive terminal of said voltage source, variable voltage control means operative with said electron path for selectively controlling the current flow through said electron path, means including a capacitive element connecting the other of said control elements to the positive terminal of said voltage source, means directly connecting said other control element to the negative terminal of said voltage source, a connection between said cathode and said negative terminal, and a connection between said anode and said positive terminal.

References Cited in the file of this patent

UNITED STATES PATENTS

| | | |
|---|---|---|
| 2,172,746 | Young | Sept. 12, 1939 |
| 2,412,485 | Whiteley | Dec. 10, 1946 |
| 2,552,949 | Fleming-Williams | May 15, 1951 |
| 2,627,025 | Trembly | Jan. 27, 1953 |
| 2,692,334 | Blumlein | Oct. 19, 1954 |

FOREIGN PATENTS

| | | |
|---|---|---|
| 613,682 | Great Britain | Dec. 1, 1948 |
| 864,702 | Germany | July 8, 1949 |